Figure 1:
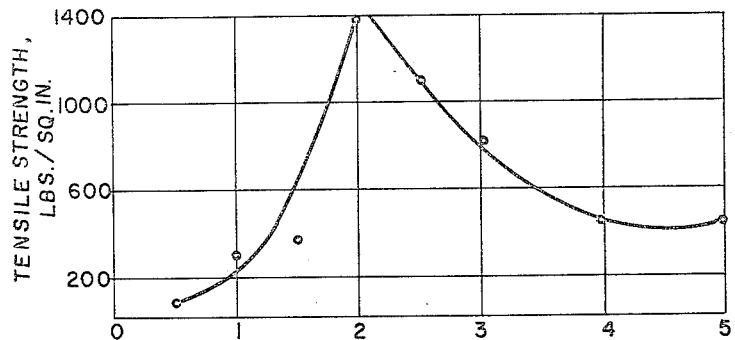

% SODIUM SILICOFLUORIDE ADMIXTURE TO FILLER
{ FILLER: 50% MILLED ZIRCON, 50% GRANULAR ZIRCON
MIX: 1000 GMS. FILLER PLUS ACCELERATOR, 180 cc. SODIUM SILICATE. }

{ FILLER: 50 PARTS MILLED ZIRCON, 50 PARTS GRANULAR ZIRCON
ACCELERATOR: 2 PARTS SODIUM SILICOFLUORIDE
MIX: 1000 GMS. FILLER PLUS ACCELERATOR, 180 cc. SODIUM SILICATE }

INVENTOR
VERNE WESLEY WEIDMAN

BY  *Harry J. M<sup>c</sup>Cauley*

ATTORNEY

Dec. 11, 1956 V. W. WEIDMAN 2,773,776
REFRACTORY CEMENT
Filed April 21, 1953 2 Sheets-Sheet 2

INVENTOR
VERNE WESLEY WEIDMAN

BY Harry J. McCauley

ATTORNEY

United States Patent Office 2,773,776
Patented Dec. 11, 1956

2,773,776

REFRACTORY CEMENT

Verne Wesley Weidman, Wilmington, Del., assignor to E. I. du Pont de Nemours and Company, Wilmington, Del., a corporation of Delaware Application April 21, 1953, Serial No. 350,033

3 Claims. (Cl. 106—57)

This invention relates to a refractory cement composition, and particularly to a corrosion-resistant refractory cement composition comprising sodium silicate as the binder, zircon as the filler and sodium silicofluoride as the setting accelerator.

Many chemical manufacturing operations require equipment fabricated from refractory materials of construction of high strength and shock resistance as well as high corrosion resistance, and the trend is toward the maintenance of even more severe process conditions in an effort to obtain higher reaction rates and product yields. One type of refractory cement which has perhaps been hitherto used more than any other is the composition comprising sodium silicate as the binder and particulate silica as the filler. This cement, while useful in many applications, possesses several serious disadvantages, in that it is characterized by relatively poor dimensional stability and poor heat shock resistance.

I have now found that an improved refractory cement is obtained when a mixture of granular and milled zircon, i. e., naturally occurring zirconium silicate, is employed as the filler with sodium silicate as the binder and sodium silicofluoride as the setting accelerator. Extensive tests have shown that zircon-filled cements of the type hereinafter described in detail are vastly superior to silica-filled cements in strength, heat shock resistance and porosity, while still having high corrosion resistance and being obtainable at comparable cost. Furthermore, the setting of my new cement composition can be accelerated within desired limits by varying the proportion of the sodium silicofluoride ingredient to suit the requirements, the sodium silicofluoride also contributing an increase in tensile strength within the practical range of workability whereupon it serves a dual purpose.

Figure 2:
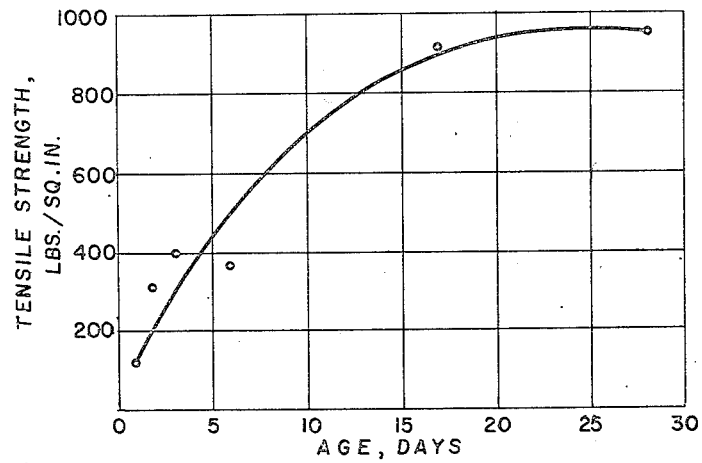
Figure 3:
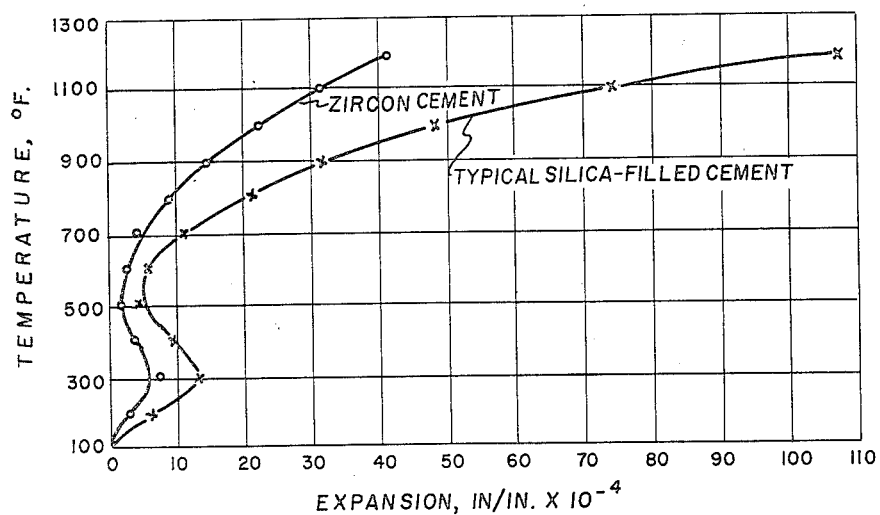
Figure 4:
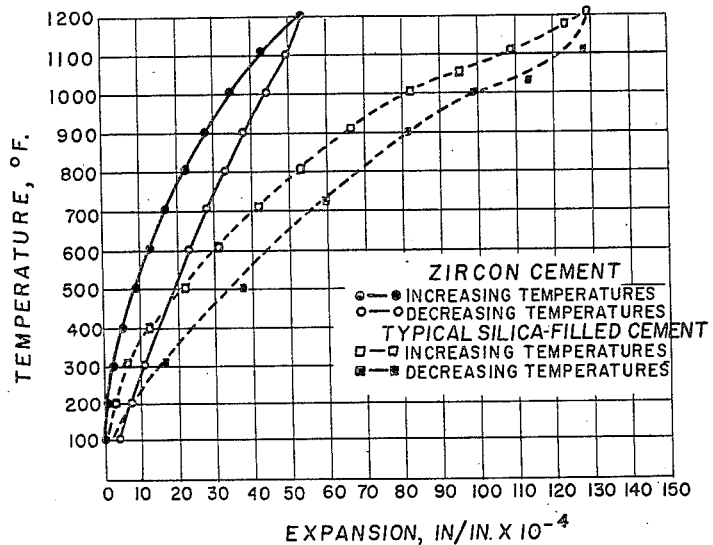

An object of this invention is to provide an improved refractory cement composition. Other objects of this invention are to provide a refractory composition adapted to use as either a cement or mortar for binding other refractory materials into a unitary structure, or as a castable material for the forming of monolithic structures without the incorporation of any other refractory substances. The manner in which these and other objects of this invention are attained will become clear from the detailed description and the accompanying drawings, in which:

Fig. 1 is a plot of tensile strength vs. percent sodium silicofluoride for zircon cement compositions according to this invention, Fig. 2 is a plot of tensile strength vs. age in days for specimens cast from a preferred zircon cement composition, Fig. 3 is a plot of temperature in degs. F. vs. expansion in in./in.$\times 10^{-4}$ during a first heating cycle for a specimen cast from a preferred zircon cement composition and for a typical silica-filled cement, and Fig. 4 is a plot of temperature in degs. F. vs. expansion in in./in.$\times 10^{-4}$ during a continuous heating and cooling cycle for a preferred zircon cement composition according to this invention and also for a typical silica-filled cement.

The refractory cement composition of this invention comprises a filler consisting of an aggregate which is an admixture of granular zircon and milled zircon to which the sodium silicofluoride accelerator is preferably added, and a binder consisting of commercial technical-grade sodium silicate. A preferred composition comprises a filler consisting of a dry aggregate mixture expressed in terms of weight of 50 parts milled zircon and 50 parts granular zircon having 1½–2 parts sodium silicofluoride added, and a sodium silicate binder in the proportion of about 1:4 by weight of binder to filler plus silicofluoride accelerator.

The zircon employed in the manufacture of cement according to this invention may vary considerably in particle size and distribution; however, a particle distribution for typical grades which proved satisfactory for the purposes is as follows:

PARTICLE SIZE DISTRIBUTION

*Granular zircon*

| Mesh size: | Percent |
|---|---|
| −80+100 | 0.2 |
| −100+120 | 1.4 |
| −120+140 | 10.3 |
| −140+160 | 18.2 |
| −160+180 | 36.5 |
| −180+200 | 20.2 |
| −200 | 13.2 |

*Milled zircon*

| Mesh size: | Percent |
|---|---|
| +325 | 1–5 |
| −325 | 95–99 |

In summary, the particle size distribution of the granular zircon may be approximately one-third in the range −80+160, one-third in the range −160+180 and one-third from −180 through 200. Similarly, the milled zircon may be about 95% finer than 325 mesh and about 5% coarser. The relative proportions of granular to milled zircon are fairly critical and best workability of the product is obtained in the range of about 50–75% granular zircon to 50–25% of milled zircon. Where the ratio of granular material exceeds that specified, the filler tends to settle to the bottom of the binder, while past the other end of the range lack of workability and high viscosity are encountered, so that in either case the product possesses undesirable properties.

A sodium silicate binder of the analysis 8.7% Na$_2$O, 28.4% SiO$_2$ and 62.9% H$_2$O, marketed as the 1 Na$_2$O.3.25 SiO$_2$ product, was employed in making up the samples for which the test results hereinafter reported were obtained. The sodium silicofluoride was a commercial grade analyzing 99% (min.) Na$_2$SiF$_6$, 0.5% (max.) H$_2$O, and 0.1% (max.) impurities.

It is preferred to mix the filler aggregate containing the accelerator as a separate step, which can be conveniently accomplished by making up a batch having the correct proportions of granular zircon, milled zircon and sodium silicofluoride, and mixing the dry material intimately, as by the use of a double cone blender, a minimum mixing cycle requiring about ½ hour at a speed of 25 R. P. M. The mixed filler and accelerator are incorporated into the binder by adding in increments, with thorough mixing between successive additions, until the preferred ratio of about 1.0 part filler plus accelerator to 0.23–0.27 part binder is obtained or, expressed on a convenient weight/volume basis, until about 1000 gms. filler plus accelerator is incorporated with 180 cc. sodium silicate. If it is desirable to prolong the working time of the cement mixture it is necessary to conduct the mixing of the filler and binder in a cool environment, such as room temperature (70° F.), higher environmental temperatures reducing the set time proportionately. After thorough mixing of the filler with the binder the cement is ready for use and, when mixing is conducted as hereinabove described, the product remains sufficiently plastic to be applied with a trowel or cast for a period of approximately 30–45 minutes.

The tensile strength of the refractory compositions of this invention is critically dependent on the percentage concentration of the sodium silicofluoride ingredient in the filler, as shown by Fig. 1. The tensile strength data here plotted were obtained on samples made up with a filler consisting of 50% milled zircon–50% granular zircon and varying percentages of sodium silicofluoride as accelerator employed in the ratio of 1000 gms. filler plus accelerator to 180 cc. sodium silicate binder. Figure-8 shaped samples as described under A. S. T. M. C 190–49, Standard Method of Test for Tensile Strength of Hydraulic-Cement Mortars, and aged for 14 days under ambient laboratory conditions (ca. 70–80° F. temperature and 50–95% relative humidity) were subjected to tensile stresses applied at a loading rate of 500 lb./min. As the plot clearly shows, enhanced tensile strength was exhibited at percentages of sodium silicofluoride ranging from about 1½% to about 3½%. It was found, however, that samples containing appreciably more than 2.0% sodium silicofluoride set relatively rapidly; wherefore, from the standpoint of workability in the usual applications for compositions of this type, it is preferred to limit the percentage of sodium silicofluoride within the range of about 1½–2%.

The effect of aging on tensile strength for the compositions of this invention is shown in Fig. 2 which constitutes a plot of the tensile strength of samples made up of 50 parts milled zircon, 50 parts granular zircon, 2 parts accelerator (1000 gms. filler plus accelerator/180 cc. sodium silicate binder) cast into figure-8 shaped specimens prepared and tested as described for Fig. 1 after aging at room temperatures for varying periods. It is apparent that tensile strength increases with aging up to about 23 days after which there is a leveling off as regards this property. The difference in maximum tensile strength obtained for the data of Figs. 1 and 2 is probably due to differences in mixing thoroughness, and in setting temperatures and humidities, all data being obtained without the use of conditioning cabinets or other precise laboratory apparatus and without special precautions which are necessary to obtain high reproducibility of results, particularly in the field of ceramics. Additional tests hereinafter reported indicate that it is usually possible to obtain tensile strengths ranging from about 800 lbs./sq. in. to about 1400 lbs./sq. in. or even higher, which represents a two- or three-fold improvement over comparable silica-filled compositions.

One of the most important properties of the zircon cement compositions of this invention is their resistance to heat and thermal shock. A typical sample of 50–50–2 composition hereinabove described having a ratio of filler plus accelerator to binder of 1000 gms./180 cc. possessed a tensile strength of 1950 lbs./sq. in. after exposure to a temperature of 1800° F. for 16 hrs. Another sample of the same composition was quenched three times in succession from 600° F. in water at room temperature, when it was subjected to tensile test and found to have a strength of 670 lbs./sq. in. Yet another sample withstood a water quench from 1200° F. to room temperature without cracking, although the tensile strength in this case fell to 260 lbs./sq. in. Three successive water quenches from 1200° F. failed to crack other specimens, however, the final tensile strength was only of the order of 70 lbs./sq. in.

The superiority in thermal shock resistance of zircon-filled cements as compared with silica-filled cements is believed due to the low, comparatively regular coefficient of thermal expansion for the zircon as contrasted with the relatively high, irregular coefficient for the silica product. The relative expansion of 1" x 1" x 12" samples of both of these materials were determined at different temperatures and the results are plotted in Figs. 3 and 4. It will be noted that the slopes of both pairs of curves are non-linear but that the zircon cement plot approaches linearity more closely than does the silica cement curve, indicating that the thermal coefficient of expansion of zircon cements is appreciably more regular. An even greater difference in absolute thermal coefficients of expansion is evident, the silica-filled cement showing approximately twice the expansion of the zircon product. The irregularity in both of the expansion curves of Fig. 3 in the range of 100–500° F. is believed due to the loss of the chemically combined water which results in an initial permanent shrinkage on heating which, of course, is not repeated on any later heatings as will be seen in Fig. 4.

Comparative plots for a complete heating-cooling cycle on a single reheating are shown for the zircon and silica-filled cements in Fig. 4 wherein the low, regular thermal coefficient of expansion for zircon-filled cements is even more clearly apparent than in Fig. 3. This property is believed responsible for the very high thermal stability of the compositions of this invention and intensive testing at exposures as long as 4 hours at temperatures as high as 2500° F. failed to develop cracks or visually detectible flaws signaling deterioration under this drastic treatment.

Briquet samples of 50–50–2 zircon-filled cements having a ratio of filler plus accelerator to binder of 1000 gms./180 cc. were tested for corrosion resistance by immersion for one week in test solutions maintained at 80° C.

The resulting data are tabulated as follows:

| Exposure Medium | Tensile Strength, lbs./sq. in. | Weight Change, Percent | Exposure Medium | Tensile Strength, lbs./sq. in. | Weight Change, Percent |
| --- | --- | --- | --- | --- | --- |
| Blank | 1,035 | -------- | 65% HNO₃ | 505 | −1.7 |
| 37% HCl | 755 | +0.7 | 10% HNO₃ | 620 | −3.2 |
| 10% HCl | 540 | −2.9 | 2% HNO₃ | 720 | −3.3 |
| 2% HCl | 395 | −2.6 | 10% NaOH | 0 | −100.0 |
| 95% H₂SO₄ | 430 | +2.3 | 2% NaOH | 0 | −100.0 |
| 60% H₂SO₄ | 360 | +1.2 | 10% NaCl | 1,395 | −1.4 |
| 10% H₂SO₄ | 470 | −2.1 | 2% H₃PO₄ | 770 | −3.2 |
| 2% H₂SO₄ | 435 | −2.9 | Steam (25 lbs./sq. in. for 3 hrs.) | 1,090 | −1.3 |
| Tap Water | 615 | −3.0 | | | |

Comparison samples of a typical silica-filled cement were subjected to the same corrosion test treatment and, in all exposures, except for the NaOH medium, where both compositions were completely destroyed by dissolution of the silicate binder, the zircon-filled cement displayed superior corrosion resistance by a factor of two- to five-fold.

The foregoing tests have been reported exclusively on the tensile basis, for the reason that tensile testing affords a particularly severe standard of performance for materials of the class comprising refractory mortars; however, a number of additional tests were made in further confirmation of the excellent properties of the cement compositions of this invention. In this connection, 50–50–2 samples made up from 1000 gms. filler plus accelerator to 180 cc. binder, aged 21 days, were found to possess compressive strengths averaging 5950 lbs./sq. in. and flexural strengths averaging 2550 lbs./sq. in. The same composition tested as a ⅛" mortar layer in the bonding of acid-resistant shale brick displayed a bond strength of 225 lbs./sq. in. (according to the method of test for bond strength of chemical-resistant mortars, A. S. T. M. designation (C321–54T.) The corresponding results for a typical silica-filled cement were about half those obtained for the zircon cements. In addition, the linear shrinkage of zircon cement in setting and the percent apparent porosity were appreciably lower for the zircon compositions than for the silica cements.

The addition of refractory staple fibrous materials to the zircon cement mixes appears to produce an increase in tensile strength, long fiber asbestos being most effective in this respect followed in order of merit by short fiber asbestos, ¼" glass fibers and, finally, vermiculite, which latter appeared to have little or no effect at all on this property.

From the foregoing description it will be understood that the zircon cement compositions of this invention can be varied relatively widely in composition, particle distribution of filler, the employment of additives and in other respects, wherefore it is intended to be limited only by the scope of the following claims.

What is claimed is:

1. A corrosion-resistant refractory cement composition consisting essentially of a workable mixture made up of a filler of granular zircon having a particle size distribution such that approximately one-third lies in the range from 80 to 160 mesh, one-third from 160 to 180 mesh and one-third finer than 180 mesh and milled zircon having a particle size distribution such that aproximately 95% by weight is finer than 325 mesh, said granular zircon being in the proportion of about 50 to 75% by weight of the total zircon, about 1½ to 2% by weight sodium silicofluoride setting accelerator, and a binder of aqueous sodium silicate.

2. A corrosion-resistant refractory cement composition according to claim 1 wherein the proportion of binder to filler plus setting accelerator is in the ratio of about 1:4 by weight.

3. A corrosion-resistant refractory cement composition according to claim 1 wherein the binder comprises 1 $Na_2O.3.25SiO_2$ in aqueous solution in the proportion of about 8.7% $Na_2O$, 28.4% $SiO_2$ and 62.9% $H_2O$ by weight.

References Cited in the file of this patent
UNITED STATES PATENTS 2,429,872   Downs _____ Oct. 28, 1947